(12) United States Patent
Hong et al.

(10) Patent No.: US 7,666,546 B2
(45) Date of Patent: Feb. 23, 2010

(54) LITHIUM SECONDARY BATTERY

(75) Inventors: Eui Sun Hong, Cheonan-si (KR); Yoon Tai Kwak, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 320 days.

(21) Appl. No.: 11/223,439

(22) Filed: Sep. 9, 2005

(65) Prior Publication Data

US 2006/0057456 A1 Mar. 16, 2006

(30) Foreign Application Priority Data

Sep. 9, 2004 (KR) .................. 10-2004-0072327

(51) Int. Cl.
*H01M 2/14* (2006.01)
(52) U.S. Cl. .................. 429/129; 429/72; 429/163; 429/176
(58) Field of Classification Search .................. 429/163, 429/167, 175, 72, 129, 176
See application file for complete search history.

(56) References Cited

U.S. PATENT DOCUMENTS 5,888,670 A * 3/1999 Kawakami ............... 429/231.4
7,241,529 B2   7/2007 Cho 2002/0081483 A1 * 6/2002 Nemoto et al. ............. 429/53
2003/0077484 A1 * 4/2003 Cho ............................ 429/7

FOREIGN PATENT DOCUMENTS

| JP | 58-144759 | 9/1983 |
|---|---|---|
| JP | 5-74424 | 3/1993 |
| JP | 6-168711 | 6/1994 |
| JP | 8-127663 | 5/1996 |
| JP | 9-120801 | 5/1997 |
| JP | 9-320551 | 12/1997 |
| JP | 10-233233 | 9/1998 |
| JP | 2003-128862 | 5/2003 |
| JP | 2004-152851 | 5/2004 |

OTHER PUBLICATIONS

Office action dated Apr. 8, 2009 for corresponding Japanese Patent Application No. 2005-246336 listing references cited in an IDS Apr. 23, 2009, in addition to JP 58-144759 cited above.
Partial English translation for JP 58-144759, previously cited in an IDS with certification dated May 4, 2009.

* cited by examiner

*Primary Examiner*—Patrick Ryan
*Assistant Examiner*—Ben Lewis
(74) *Attorney, Agent, or Firm*—Christie, Parker & Hale, LLP

(57) ABSTRACT

A lithium secondary battery includes an electrode assembly having first and second electrodes wound together with a separator interposed between them and an insulation case positioned on the electrode assembly. The insulation case is made of a resin or resin composite material having a tensile strength of at least 500 $kg/cm^2$.

10 Claims, 3 Drawing Sheets

LITHIUM SECONDARY BATTERY

CROSS-REFERENCE TO RELATED APPLICATIONS

This application claims priority to and the benefit of Korean Patent Application No. 2004-0072327KR filed on Sep. 9, 2004 in the Korean Intellectual Property Office, the entire content of which is incorporated herein by reference.

BACKGROUND OF THE INVENTION

1. Field of the invention

The present invention relates to a lithium secondary battery, and more particularly to a lithium secondary battery adapted to uniformly distribute stress applied to the electrode assembly when the battery is subject to a physical external force to prevent the battery from short-circuiting.

2. Description of the Related Art

In general, a secondary battery refers to a battery adapted to be charged and discharged, in contrast to a primary battery which is not chargeable, and is widely used in the cutting-edge electronic appliance field including cellular phones, laptop computers, and camcorders. Particularly, a lithium secondary battery has an operating voltage of at least 3.6V, which is three times larger than that of a nickel-cadmium battery or a nickel-hydrogen battery frequently used as the power source of a portable electronic appliance. The lithium secondary battery also has a high energy density per unit weight and, for these reasons, has rapidly prevailed in the industry.

Lithium secondary batteries generally use lithium-based oxide as the positive electrode active material and carbon material as the negative electrode active material. Electrolyte type lithium secondary batteries are generally classified into lithium ion batteries using a liquid electrolyte and lithium polymer batteries using a polymer electrolyte. Lithium secondary batteries are manufactured in various shapes including a cylinder, a square, and a pouch.

FIG. 1 is an exploded perspective view briefly showing a conventional can-type lithium secondary battery. A lithium secondary battery is formed by placing an electrode assembly 12 composed of a first electrode 13, a second electrode 15, and a separator 14 into a can 10 together with an electrolyte and sealing the top of the can 10 with a cap assembly 70.

The cap assembly 70 includes a cap plate 71, an insulation plate 72, a terminal plate 73, and an electrode terminal 74. The cap assembly 70 is coupled to the top opening of the can 10 and seals it. An insulation case 79 is installed in the upper portion of the electrode assembly 12 in order to prevent the electrode assembly 12 from contacting the cap assembly 70 and the can 10.

The cap plate 71 is a metal plate having a size and a shape corresponding to those of the top opening of the can 10. The cap plate 71 has a terminal through-hole formed at the center thereof with a predetermined size, into which the electrode terminal 74 is inserted. When the electrode terminal 74 is inserted into the terminal through-hole, a gasket tube 75 is coupled to the outer surface of the electrode terminal 74 and is inserted together for insulation between the electrode terminal 74 and the cap plate 71. The cap plate 71 has an electrolyte injection hole 76 formed on a side thereof with a predetermined size. After the cap assembly 70 is assembled to the top opening of the can 10, an electrolyte is injected through the electrolyte injection hole 76, which is then sealed by a plug 77.

The electrode terminal 74 is connected to the second electrode tab 17 of the second electrode 15 or to the first electrode tab 16 of the first electrode 13 and acts as a second or first electrode terminal. The remaining electrode not connected to the electrode terminal 74 is typically connected to can 10. Insulation tapes 18 are wound around the portions through which the first and second electrode tabs 16 and 17 are drawn from the electrode assembly 12, respectively, to avoid short-circuiting between the electrodes 13 and 15. The first or second electrode acts as a positive or negative electrode.

In the can-type lithium secondary battery, the insulation case 79 is inserted between the cap assembly 70 and the electrode assembly 12 to fix the position of the electrode assembly 12, as well as that of the electrode tabs 16 and 17, and is made of polypropylene material. The insulation case made of polypropylene material has a disadvantage of increasing the thickness of the battery, but the shape of the battery can vary with the manufacturer. Furthermore, the polypropylene material has weak rigidity and, when the electrode assembly is shifted toward the cap assembly during a drop test and the like, it deforms and causes local stress to be applied to the top of the electrode assembly. This results in short-circuiting. Although every manufacturer is trying to avoid short-circuiting resulting from such a physical external force by modifying the shape of the insulation case, the danger of short-circuiting still exists due to the rigidity of the polypropylene material itself.

SUMMARY OF THE INVENTION

In one embodiment of the present invention, a lithium secondary battery has an insulation case which does not easily deform, even when subject to a physical external force, and which can uniformly distribute stress applied to the electrode assembly during floating to prevent the battery from short-circuiting and to improve safety.

In another embodiment of the present invention, there is provided a lithium secondary battery including an electrode assembly having first and second electrodes wound together with a separator interposed between them and an insulation case positioned on top of the electrode assembly, wherein the insulation case is made of a resin or resin composite material having a tensile strength of at least 500 kg/cm$^2$.

The resin or resin composite material preferably has a compressive strength of at least 900 kg/cm$^2$.

DETAILED DESCRIPTION

An insulation case plays the role of fixing the position of an electrode assembly contained in a can of a lithium secondary battery, as well as that of electrode tabs drawn from first and second electrodes of the electrode assembly. Insulation cases have been made of polypropylene, which is a conventional insulating material in order to avoid short-circuiting between the electrode tabs. However, a polypropylene insulation case has weak strength and may be deformed by a physical external force such as during a drop test of the battery.

When a body is acted on by an external force, in general, it deforms and generates a resistant force which counterbalances the external force. Such a resistant force is termed an "internal force," the size of which per unit area is termed "stress." Stress is classified into normal stress and shear stress, and the normal stress is further classified into tensile stress and compressive stress.

Tensile strength is the maximum stress a material can endure and is defined as the breaking load, when a tensile load is applied to the material, divided by the initial sectional area. Compressive strength is a characteristic value of a material indicating the material strength against a compressive load and is defined as the compressive breaking load per unit area. Polypropylene has a tensile strength of 340 kg/cm$^2$ and a compressive strength of 500 kg/cm$^2$. This means that its normal stress against external force acting in the normal direction is poor in the context of insulation cases.

Figure 1:
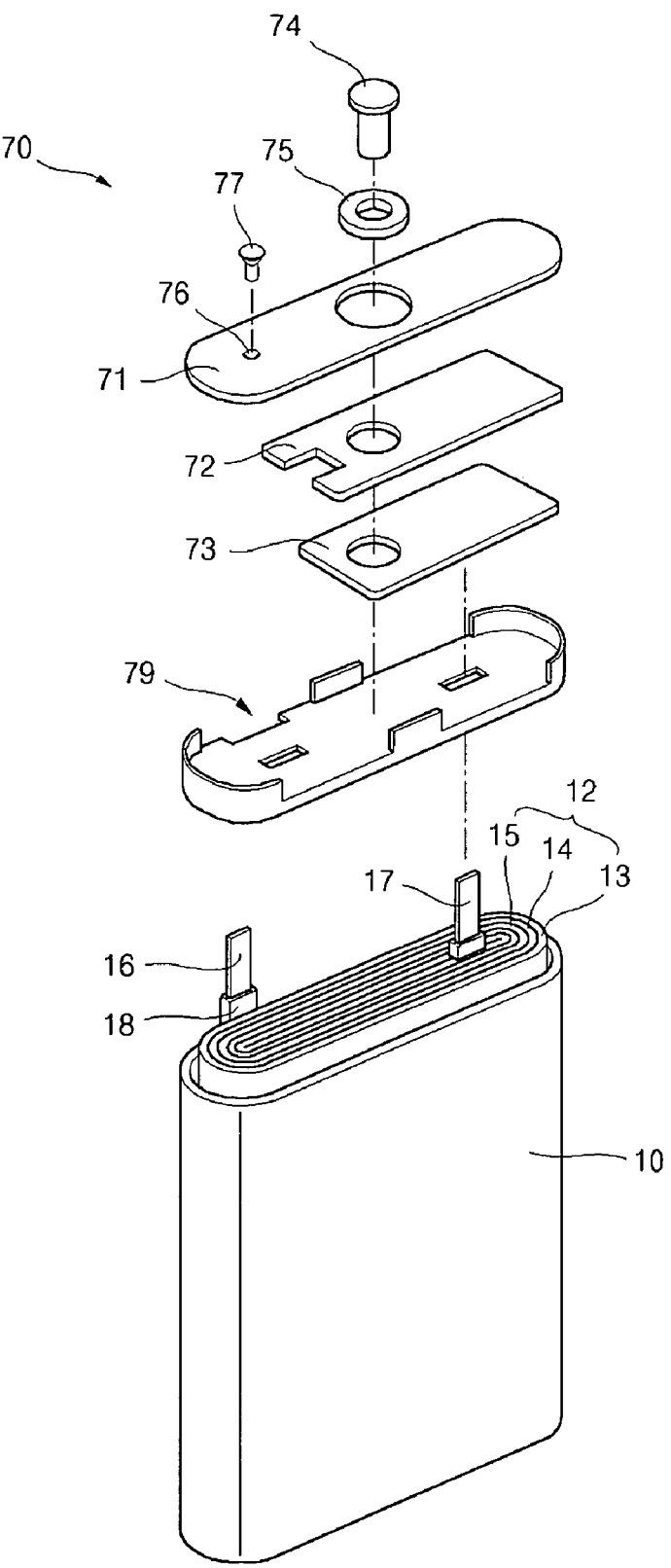
FIG. 1 is an exploded perspective view briefly showing a conventional secondary battery.
Figure 2:
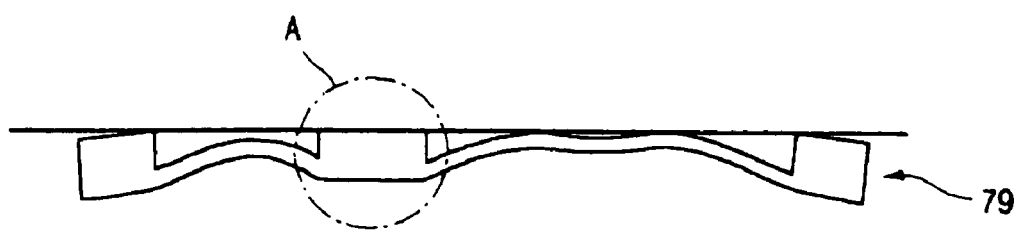
FIG. 2 is a sectional view showing a polypropylene insulation case deformed by a physical external force.

FIG. 2 is a sectional view showing the polypropylene insulation case 79 of FIG. 1 deformed by a physical external force. Although the insulation case 79 shown in FIG. 1 uniformly applies a force over the entire upper surface of the electrode assembly, the polypropylene insulation case 79 deformed as shown in FIG. 2 applies a concentrated load to the electrode assembly at the center A thereof. Such local stress applied to the center of the upper portion of the electrode assembly by the deformed polypropylene insulation case may cause the battery to short-circuit.

In some embodiments of the present invention, the insulation case is made of a resin or resin composite material having excellent strength, and which hardly deforms, even when subject to a physical external force. Therefore, local stress is not applied to the electrode assembly even in the case of a strong impact, and stress is uniformly distributed.

The inventive insulation case can be made of a resin or resin composite material having a tensile strength of at least 500 kg/cm$^2$. In one embodiment, the resin or resin composite material has a compressive strength of at least 900 kg/cm$^2$. If the tensile strength of the resin or resin composite material is smaller than 500 kg/cm$^2$, deformation reduction effect of the insulation case during a drop test of the battery may be unfavorably trivial. The tensile strength may be measured according to ASTM D638 method and the compressive strength according to ASTM D695.

The inventive insulation case can be made of a material which has excellent strength as mentioned above, and which does not react with a non-aqueous electrolyte including lithium salt used in the lithium secondary battery. The non-aqueous electrolyte of the lithium secondary battery includes an organic solvent of carbonate, ester, ether, or ketone and, if the insulation case does not have resistance to such an organic solvent, it may be corroded by the latter.

The resin may be a phenol resin, a glass fiber-reinforced resin, or a carbon fiber-reinforced resin. However, the resin or resin composite material used in the present invention is not limited herein.

In one embodiment, the phenol resin is an industrialized composite resin invented by Bakeland of USA in early 1900 and is available under the product name BAKELITE™. The phenol resin is a thermosetting resin created in a reaction between phenol and formaldehyde and has excellent electrical insulation, mechanical strength, and heat-resistance. The primary resin created by an acid catalyst during a reaction process between phenol and formaldehyde is referred to as "novolak" and the resin created by a basic catalyst is referred to as "resol." In this embodiment, the phenol resin has a tensile strength of 520 kg/cm$^2$ and a compressive strength of 1400 kg/cm$^2$.

Figure 3:
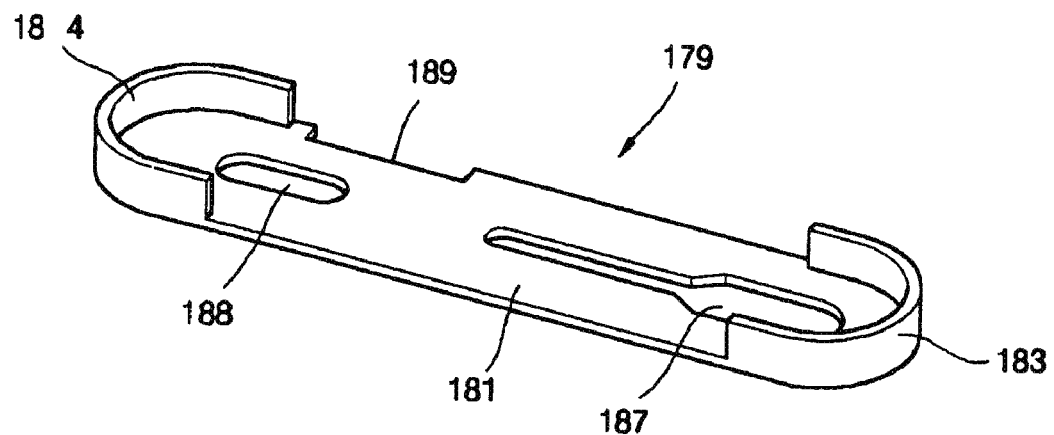
FIG. 3 is a perspective view showing an insulation case according to an embodiment of the present invention.

Referring to FIG. 3, an insulation case 179 includes a main body 181 and lateral end supporters 183 and 184 positioned on both lateral ends of the main body 181, respectively. The main body 181 has a size and a shape corresponding to those of the top opening of the can 10 shown in FIG. 1. The lateral end supporters 183 and 184 protrude upward for a predetermined distance and are adapted to support the main body 181 from both lateral ends and prevent the insulation case 179 and the electrode assembly 12 from floating when the can 10 is vibrated or impacted. The main body 181 has an electrode tab drawing opening 187 formed on a side thereof to allow the second electrode tab 17 to be drawn out and an electrolyte inlet opening 188 formed on the other side thereof to provide a path along which an electrolyte can flow into the electrode assembly 12. The main body 181 also has a stepped portion 189 formed on a lateral surface thereof to allow the first electrode tab to be drawn out.

Referring to FIG. 3, the insulation case 179 may have an electrode tab drawing opening 187, an electrolyte injection opening 188, and a stepped portion 189 formed on the main body 181. The size and position of the openings 187 and 188 and the stepped portion 189 are determined in such a manner that the strength of the insulation case does not degrade. As the material strength of the inventive insulation case increases, the shape and size of the openings 187 and 188 and the stepped portion 189 formed on the main body 181 can be chosen in a wider range.

Figure 4:
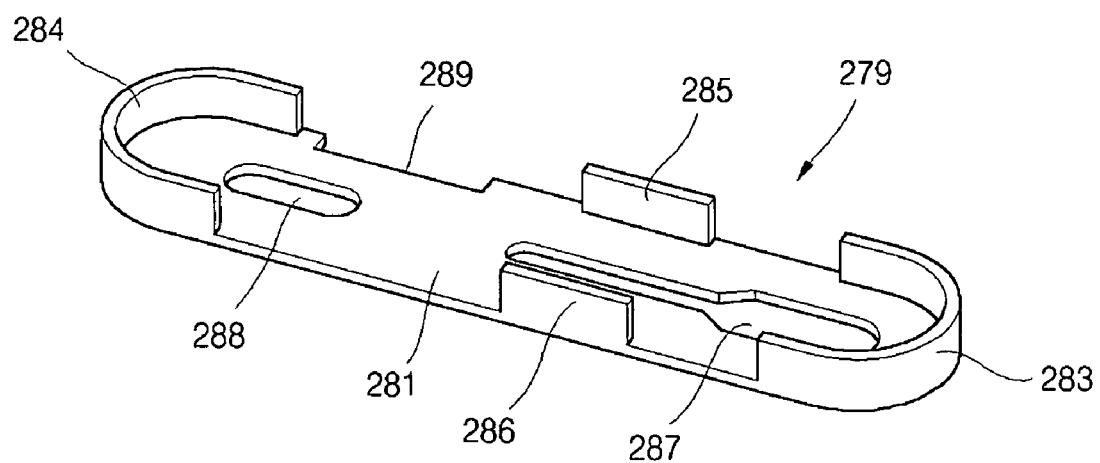
FIG. 4 is a perspective view showing an insulation case according to another embodiment of the present invention.

Referring to FIG. 4, the insulation case 279 includes a main body 281, lateral ends supporters 283 and 284 positioned on both lateral ends thereof, respectively, and at least one lateral surface supporter 285 and 286 positioned on each of both lateral surfaces of the main body 281. The lateral surface supporters 285 and 286 protrude upward a predetermined distance from a predetermined position on a lateral surface of the main body 281 and support the main body 281 from the lateral surface in a more stable manner.

The inventive insulation cases 179, 279 shown in FIGS. 3 and 4 are made of a resin or resin composite material having a tensile strength of at least 500 kg/cm$^2$. Accordingly, the cases are hardly deformed by a physical external force and the cases uniformly distribute stress applied to the electrode assembly.

Although the polypropylene insulation case has relatively weak strength and needs a lateral surface supporter or an equivalent thereof, these embodiments are made of a material having excellent strength, and may or may not include a lateral supporter or an equivalent thereof. Even when the thickness of the case is smaller, furthermore, there is no concern about strength degradation. As the insulation case is made of a material having excellent strength, the shape and size of the insulation case can be chosen in a wider range.

As mentioned above, the present invention uses an insulation case made of a material having excellent strength to uniformly distribute stress applied to the electrode assembly, even when subject to a physical external force, thereby preventing the battery from short-circuiting and improving safety.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising:
a can;

an electrode assembly in the can, the electrode assembly comprising first and second electrodes wound together with a separator between them;

a cap assembly coupled to the can; and an insulation case between the electrode assembly and the cap assembly, wherein the insulation case comprises a glass fiber-reinforced resin or a carbon fiber-reinforced resin having a tensile strength of at least 500 kg/cm$^2$, and wherein the insulation case comprises a main body and lateral end supporters on lateral ends of the main body, and at least one of the lateral end supporters protrudes in an upward direction.

2. The lithium secondary battery as claimed in claim 1, wherein the glass fiber-reinforced resin or the carbon fiber-reinforced resin has a compressive strength of at least 900 kg/cm$^2$.

3. The lithium secondary battery as claimed in claim 1, wherein the glass fiber-reinforced resin or the carbon fiber-reinforced resin does not react with an electrolyte.

4. The lithium secondary battery as claimed in claim 1, wherein the lateral end supporters protrude in the upward direction.

5. The lithium secondary battery as claimed in claim 1, wherein the insulation case further comprises at least one lateral surface supporter on a lateral surface of the main body.

6. The lithium secondary battery as claimed in claim 5, wherein the at least one lateral surface supporter protrudes in an upward direction.

7. The lithium secondary battery as claimed in claim 1, wherein the main body of the insulation case has an electrode tab drawing opening or electrolyte injection opening, or both formed on the main body.

8. An insulation case for a lithium secondary battery having a cap assembly covering an electrode assembly mountable in a battery case, the insulation case comprising a glass fiber-reinforced resin or a carbon fiber-reinforced resin having a tensile strength of at least 500 kg/cm$^2$, the insulation case being mountable between the electrode assembly and the cap assembly, wherein the insulation case comprises a main body and lateral end supporters on lateral ends of the main body, and at least one of the lateral end supporters protrudes in an upward direction.

9. The insulation case as claimed in claim 8, wherein the glass fiber-reinforced resin or the carbon fiber-reinforced resin has a compressive strength of at least 900 kg/cm$^2$.

10. The insulation case as claimed in claim 8, wherein the glass fiber-reinforced resin or the carbon fiber-reinforced resin does not react with an electrolyte.

* * * * *